United States Patent
Hidaka et al.

(10) Patent No.: US 9,980,346 B2
(45) Date of Patent: May 22, 2018

(54) LIGHTING SETTING APPARATUS AND LIGHTING SYSTEM

(71) Applicant: PANASONIC INTELLECTUAL PROPERTY MANAGEMENT CO., LTD., Osaka (JP)

(72) Inventors: Yuto Hidaka, Osaka (JP); Hiroshi Sugawara, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days. days.

(21) Appl. No.: 15/716,200

(22) Filed: Sep. 26, 2017

(65) Prior Publication Data

US 2018/0092187 A1    Mar. 29, 2018

(30) Foreign Application Priority Data

Sep. 28, 2016 (JP) .................................. 2016-190446

(51) Int. Cl.
*H05B 33/08*     (2006.01)
*H05B 37/02*     (2006.01)
*G06F 3/0484*    (2013.01)

(52) U.S. Cl.
CPC ..... *H05B 37/0218* (2013.01); *H05B 37/0272* (2013.01); *G06F 3/04847* (2013.01)

(58) Field of Classification Search
None
See application file for complete search history.

(56) References Cited

U.S. PATENT DOCUMENTS

| | | | |
|---|---|---|---|
| 2006/0028212 A1 | 2/2006 | Steiner et al. | |
| 2014/0062334 A1 | 3/2014 | Nagazoe et al. | |
| 2014/0070706 A1* | 3/2014 | Fushimi ............ | H05B 33/0863 315/131 |
| 2014/0070707 A1 | 3/2014 | Nagazoe | |
| 2014/0091731 A1 | 4/2014 | Fushimi | |

FOREIGN PATENT DOCUMENTS

| JP | 2008-509478 A | 3/2008 |
|---|---|---|
| JP | 2014-044915 A | 3/2014 |
| JP | 2014-044916 A | 3/2014 |
| JP | 2014-056670 A | 3/2014 |
| JP | 2014-056723 A | 3/2014 |
| JP | 2014-072083 A | 4/2014 |
| JP | 2014-179286 A | 9/2014 |

* cited by examiner

*Primary Examiner* — Dedei K Hammond
(74) *Attorney, Agent, or Firm* — McDermott Will & Emery LLP

(57) ABSTRACT

A lighting setting apparatus which is used to set lighting modes in a plurality of luminaires installed in a space includes: a storage which stores a lighting setting image indicating the entirety of an illumination area of the luminaires in the predetermined space and luminaire position information indicating the positions of the luminaires in the space; an input receiver which receives a user input regarding use of the lighting setting image; and a lighting setter which obtains the target pixel values of target pixels that are of the lighting setting image for which the input regarding the use has been received and that are located correspondingly to the positions of the luminaires indicated by the luminaire position information, determines, based on the obtained target pixel values, a lighting setting value for at least one of dimming or toning of the luminaires, and outputs the lighting setting value.

12 Claims, 11 Drawing Sheets

LIGHTING SETTING APPARATUS AND LIGHTING SYSTEM

CROSS REFERENCE TO RELATED APPLICATION

This application claims the benefit of priority of Japanese Patent Application Number 2016-190446 filed on Sep. 28, 2016, the entire content of which is hereby incorporated by reference.

BACKGROUND

1. Technical Field

The present disclosure relates to a lighting setting apparatus for setting dimming or toning of a plurality of luminaires.

2. Description of the Related Art

Techniques for adjusting intensity and brightness of light to be output by a plurality of dimmable and color-tunable luminaires installed in a predetermined space have been conventionally proposed.

Patent Literature 1 (PTL 1: Japanese Unexamined Patent Application Publication No. 2008-509478) discloses a technique for dividing one or more electrical/electronic devices into groups, associating each of the groups with a predetermined graphical objects, and provides an interface for controlling or monitoring the group of one or more electric/electronic apparatuses using the graphical object. Through the interface, a user can identify, to be the group, a zone that is a collection of one or more electrical/electronic devices to be controlled as one unit. When the one or more electric/electronic apparatuses are luminaires, a lighting effect (scene) is achieved by adjusting the zone to various levels.

SUMMARY

The technique disclosed in PTL 1 requires a user to take much effort for defining a plurality of groups (grouping) and creating scenes to the respective groups.

Since the scenes are created for each group of luminaires, the user needs to take much time to grasp lighting modes in the entire space and obtain an atmosphere thereof.

In order to realize lighting effects to provide a common atmosphere at a plurality of places such as a plurality of shops of the same franchise chain, a large amount of work is necessary starting with settings for the grouping suitable for the number and arrangement of luminaires at each of the places.

The present disclosure was made considering such circumstances, and has an object to provide a lighting setting apparatus which allows a user to easily execute settings for dimming and toning of a plurality of luminaires.

In order to achieve the above object, a lighting setting apparatus according to an aspect of the present disclosure is a lighting setting apparatus which is used to set lighting modes in a plurality of luminaires installed in a predetermined space, the lighting setting apparatus including: a storage which stores (i) a lighting setting image indicating an entirety of an illumination area of the plurality of luminaires in the predetermined space and (ii) luminaire position information indicating positions of the plurality of luminaires in the predetermined space, in association with the luminaire setting image; an input receiver which receives an input by a user, the input regarding use of the lighting setting image; and a lighting setter which obtains target pixel values of target pixels that are of the lighting setting image for which the input regarding the use has been received and that are located correspondingly to positions of the plurality of luminaires indicated by the luminaire position information, determines, based on the obtained target pixel values, a lighting setting value for at least one of dimming or toning of the plurality of luminaires, and outputs the determined lighting setting value.

In addition, a lighting system according to an aspect of the present disclosure includes: the lighting setting apparatus; a plurality of luminaires; and a lighting control apparatus which obtains the lighting setting value output from the lighting setting apparatus, and controls the plurality of luminaires using the lighting setting value.

In this way, the user can make the setting of the at least one of the dimming or the toning of the plurality of luminaires by setting at least one of a color or a brightness in the image corresponding to the space. The lighting modes which have been set on a per space basis as described above can be easily used for other spaces in which the number and arrangement of luminaires are different.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Hereinafter, an embodiment of the present disclosure is described in detail with reference to the drawings. It is to be noted that the embodiment described below indicates a specific example in the present disclosure. The numerical values, shapes, materials, constituent elements, the arrangement and connection of the constituent elements, steps, the processing order of the steps etc. indicated in the following exemplary embodiments are mere examples, and therefore do not limit the scope of the present disclosure. Therefore, among the constituent elements in the following exemplary embodiment, constituent elements not recited in any one of the independent claims that define the most generic concept of the present disclosure are described as arbitrary constituent elements.

Embodiment

Lighting setting apparatus 20 according to an embodiment and lighting system 10 including the same are described.

[1. Configuration]

[1-1. System Configuration]

Figure 1:
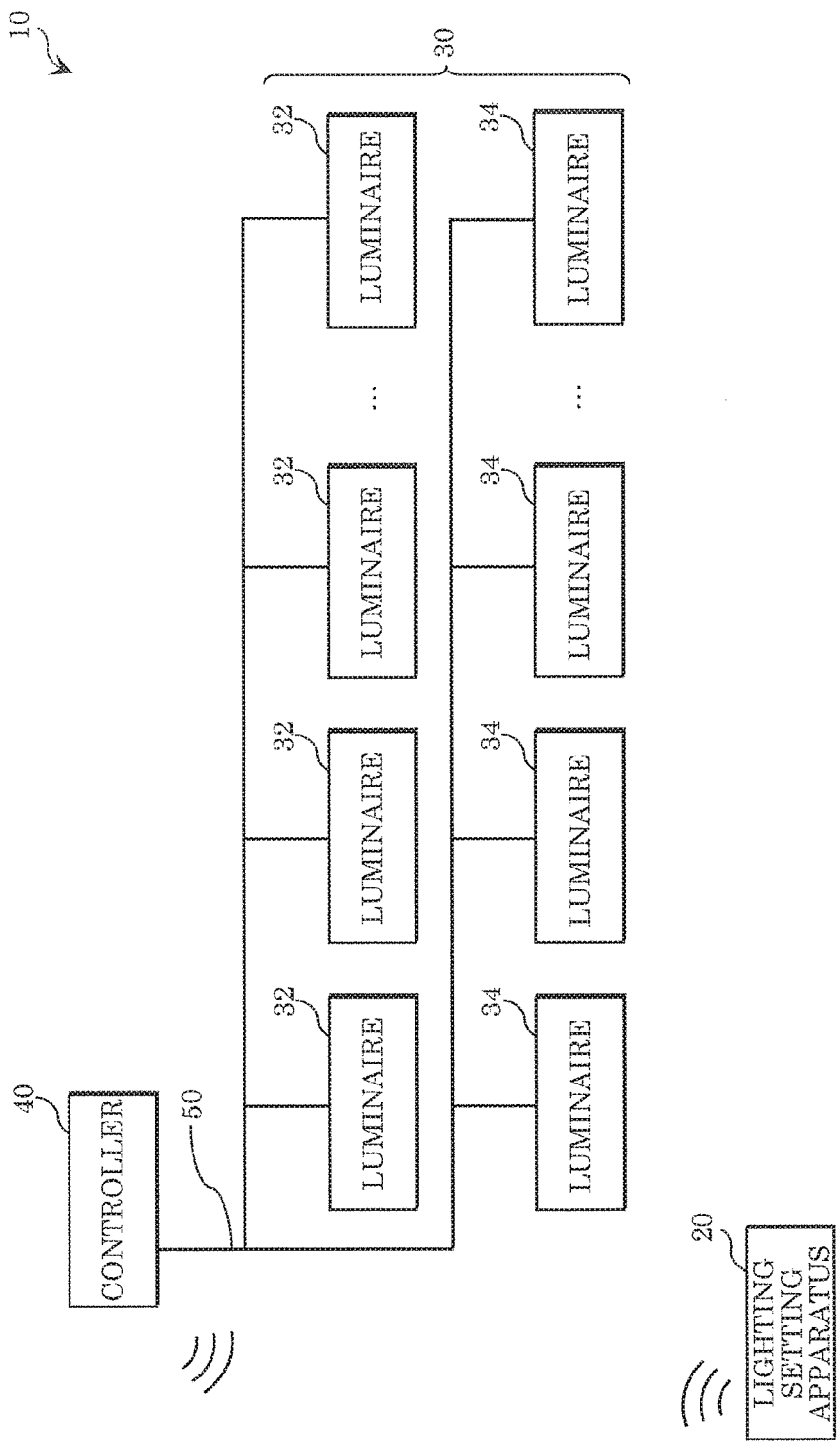
FIG. 1 is a block diagram illustrating an example of a configuration of a lighting system including a lighting setting apparatus according to an embodiment.

FIG. 1 is a block diagram illustrating an example of a configuration of lighting system 10 including lighting setting apparatus 20 according to this embodiment.

Lighting system 10 includes lighting setting apparatus 20, a plurality of luminaires 30, controller 40, and signal lines 50.

Luminaires 30 emit light under control of controller 40 to which luminaires 30 are connected through signal lines 50.

In the example illustrated in the drawing, luminaires 30 include two types of luminaires which are luminaires 32 and luminaires 34 different in specifications such as the shape of a light source. Each of luminaires 32 and luminaires 34 includes a light source capable of performing at least one of dimming or toning, and the at least one of dimming or toning is controlled by controller 40. For example, a light-emitting diode (LED), a fluorescent lamp, or an incandescent lamp is used as the light source. It is to be noted that only one type of luminaires may be included in lighting system 10. Hereinafter, all of luminaires 32 and luminaires 34 or arbitrary two or more of the same may also be referred to as a/the plurality of "luminaires 30", and an arbitrary one of the same may also be referred to as "luminaire 30".

Controller 40 is, for example, a gateway or a lighting controller. Controller 40 is an example of a lighting control apparatus according to this embodiment. Controller 40 controls luminaires 30 according to factory default settings of lighting system 10 or settings input by an installer or a user using lighting setting apparatus 20. Hereinafter, the term "user" may be used to refer to whichever of an installer and a general user who uses lighting setting apparatus 20. Signal lines 50 are transmission media through which controller 40 transmits a signal of a control instruction to control luminaires 30. In addition, information regarding operation states etc. of luminaires 30 may be transmitted from luminaires 30 to controller 40 through signal lines 50. Luminaires 30 are each assigned with a unique address at the time of installation of lighting system 10 so that controller 40 and luminaire 30 can communicate with each other. Signal lines 50 in FIG. 1 are non-limiting examples for transmission media for control instruction and information. The transmission media may be wireless transmission media or a mixture of wired transmission media and wireless transmission media.

Lighting setting apparatus 20 is a user interface of lighting system 10, and is used to set lighting modes in luminaires 30. Lighting setting apparatus 20 is an information apparatus having a communication function, such as a tablet computer or the like. Lighting setting apparatus 20 has functions for displaying, to a user, an operation screen for setting lighting modes in luminaires 30, and transmitting, to controller 40, a lighting setting value for at least one of dimming or toning of luminaires 30 and which is determined based on an input by the user. This configuration is described in detail later. Although lighting setting apparatus 20 and controller 40 communicate with each other wirelessly in FIG. 1, wired communication may be performed instead. Information regarding luminaires 30 such as operation states of luminaires 30 or the addresses of individual luminaires 30 may be transmitted from controller 40 to lighting setting apparatus 20. Lighting setting apparatus 20 may present information received from controller 40 to the user.

Figure 2:
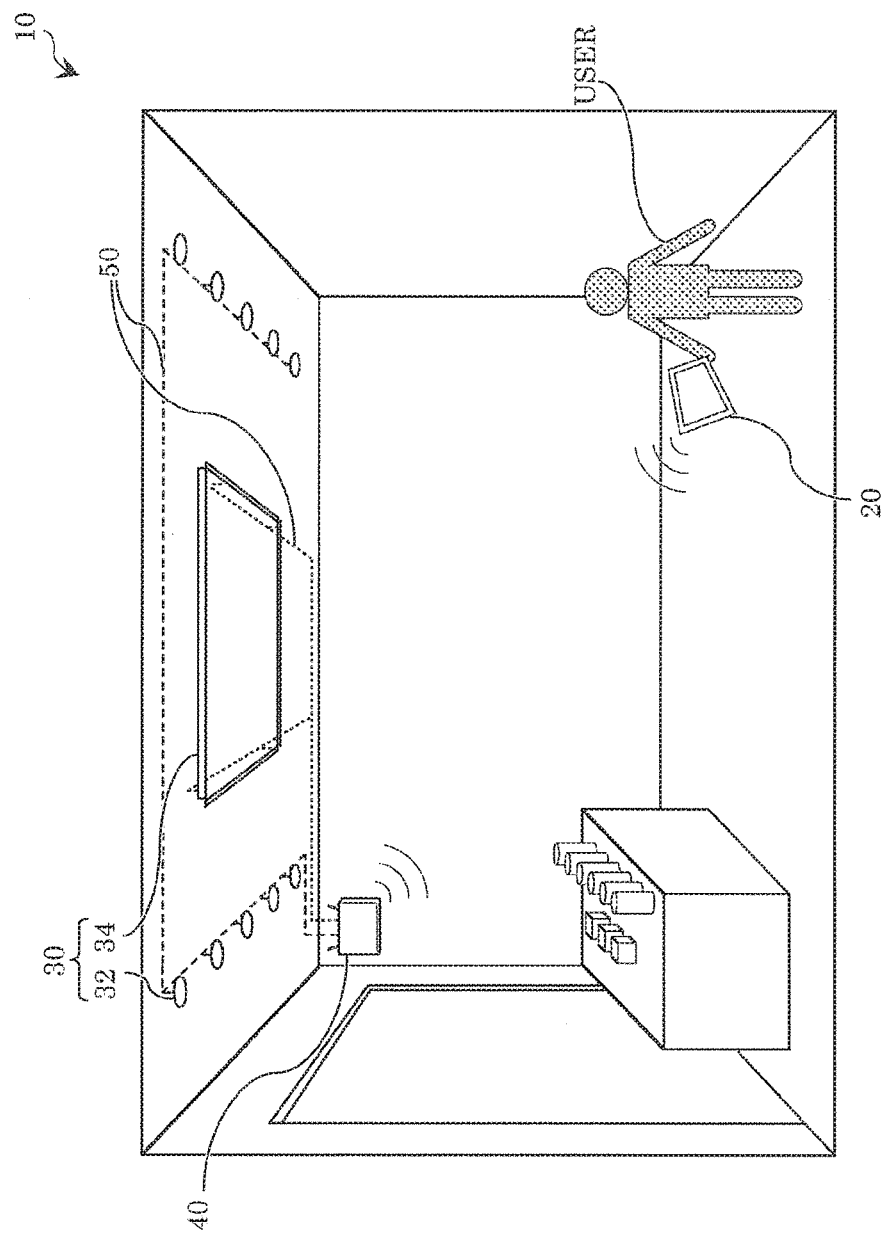
FIG. 2 is a diagram illustrating an example in which the lighting system illustrated in FIG. 1 is applied to a predetermined space.

FIG. 2 is a diagram illustrating an example in which lighting system 10 illustrated in FIG. 1 is applied to a predetermined space. In this example, a section of a given shop is used as an example of the predetermined space. Ten LED downlights in total are installed as luminaires 30 on a ceiling of the shop: five of them are installed at an entrance side of the shop and the other five are installed at the back of the shop. Four straight-tube LED lamps are installed as luminaires 34 to form a square around the center of the shop. Settings for lighting modes in luminaires 30 input by the user in the shop using a tablet computer are transmitted wirelessly to controller 40 in the shop. Controller 40 controls luminaires 30 according to the settings received from lighting setting apparatus 20. Operations which can be performed using lighting setting apparatus 20 are not limited to operations for changing settings for lighting modes of luminaires 30. For example, switching ON/OFF of a power supply of each luminaire 30 or operations such as a reactivation of lighting system 10 may be performed using lighting setting apparatus 20.

[1-2. Configuration of Lighting Setting Apparatus]

Figure 3:
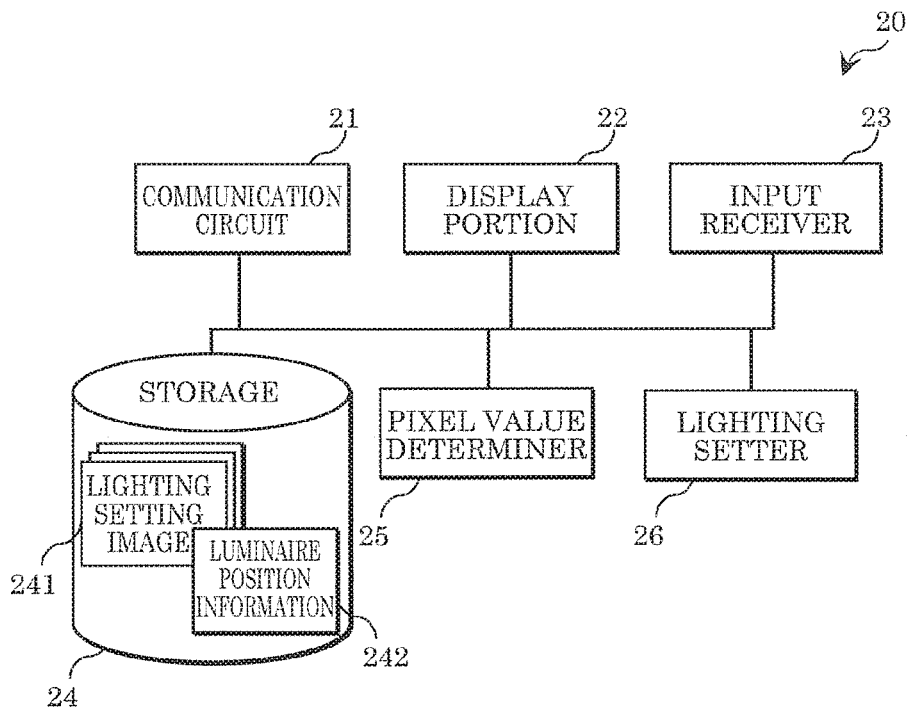
FIG. 3 is a block diagram illustrating an example of a functional configuration of the lighting setting apparatus according to the embodiment.
Figure 4:
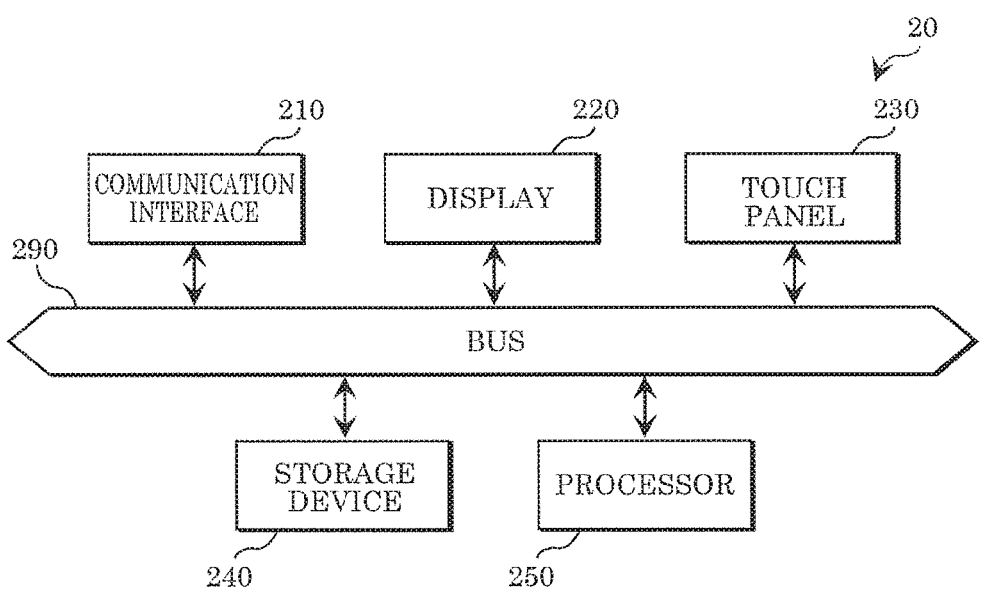
FIG. 4 is a diagram illustrating an example of a hardware configuration of the lighting setting apparatus according to the embodiment.

FIG. 3 is a block diagram illustrating an example of a functional configuration of lighting setting apparatus 20 according to this embodiment. FIG. 4 is a diagram illustrating an example of a hardware configuration of lighting setting apparatus 20 according to this embodiment. The hardware configuration illustrated in FIG. 4 is an example in which lighting setting apparatus 20 is a tablet computer.

As illustrated in FIG. 3, lighting setting apparatus 20 includes the following functional constituent elements: communication circuit 21; display portion 22: input receiver 23; storage 24; pixel value determiner 25; and lighting setter 26. As illustrated in FIG. 4, lighting setting apparatus 20 includes: communication interface 210; display 220; touch panel 230; storage device 240; processor 250; and bus 290.

Communication circuit 21 corresponds to communication interface 210, and has input and output functions for transmitting and receiving data to and from controller 40.

Display portion 22 corresponds to display 220, visually outputs and presents information to the user. Examples of information to be output visually include a lighting setting image to be described later.

Input receiver 23 corresponds to touch panel 230 and various kinds of objects which are included in an operation screen displayed on display portion 22 and can be operated through touch panel 230, and receives a user input regarding the settings for luminaires 30. Examples of such a user input include inputs regarding selection, use, new creation, adjustment (editing) of a lighting setting image to be described later.

Storage 24 corresponds to storage device 240, and stores a program for causing lighting setting apparatus 20 to function and temporary or non-temporary data to be referred to in processing according to the program. The data stored in storage 24 includes lighting setting image 241 and luminaire position information 242. Storage device 240 is configured with a rewritable random access memory (RAM) for storing temporary data, or a combination of RAM and a non-rewritable read-only memory (ROM) for storing non-temporary data.

Lighting setting image 241 is an image of a figure representing the entire illumination area of luminaires 30 in the predetermined space in which lighting system 10 is installed. For example, when the entirety of a predetermined rectangular space as illustrated in FIG. 2 is the illumination area of luminaires 30, lighting setting image 241 is an image of a rectangle. When lighting setting image 241 is displayed on display portion 22, input receiver 23 may receive a user input regarding a setting of at least one of a color or a brightness of the figure. Examples of such a user input include an input for changing and determining a color or a brightness and an input for selecting lighting setting image 241 which is an image of a figure representing a desired color or brightness when a plurality of lighting setting images 241 are stored. Lighting setting image 241 and inputs regarding the settings of the color and the brightness of figures are described in detail later. Here, the color means a hue or color temperature, and the brightness means lightness.

Figure 5:
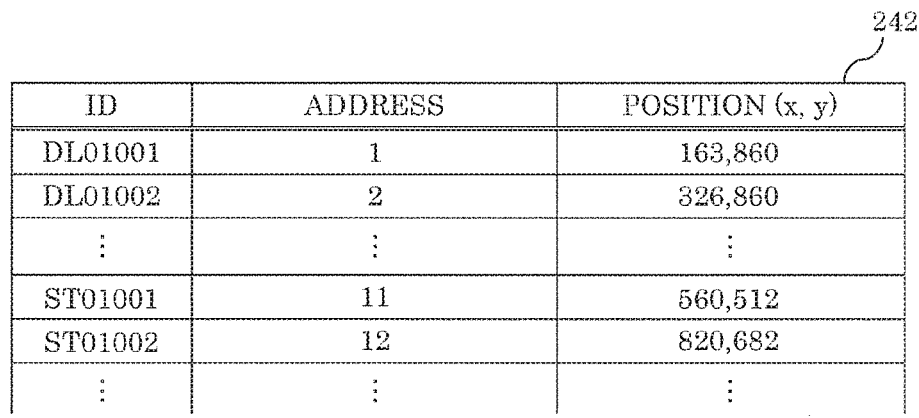
FIG. 5 is a diagram illustrating an example of a data structure of luminaire position information stored in the lighting setting apparatus according to the embodiment.

Luminaire position information 242 indicates the positions of luminaires 30 in the predetermined space, in association with lighting setting image 241. FIG. 5 is a diagram illustrating an example of a data structure of lumininaire position information 242. In the example illustrated in FIG. 5, each row is associated with one of luminaires 30 and stores the identification symbol (information in the column with a label "ID"), the network address (information in the column with a label "ADDRESS") of lighting system 10, and position information (information in the column with a label "POSITION (x, y)" of the one associated with the row. Assuming that lighting setting image 241 is in an xy plane, the position information indicates, as xy coordinates in the xy plane, the position of one of the pixels which composes lighting setting image 241 and corresponds to the position of each of luminaires 30 which illuminates the illumination area, for example, the position of the center of a corresponding one of luminaires 30. Such association is defined, for example, when an installer installs lighting system 10 in a predetermined space, together with setting operations for establishing communication paths between luminaires 32, luminaires 34, controller 40, and lighting setting apparatus 20. Coordinates which are the position information may be numerical values calculated using, for example, a diagram such as a plan view for installation in the space or an image for the space, or numerical values input by the user.

When input receiver 23 receives, from the user, an input regarding a setting of a color or a brightness of lighting setting image 241, pixel value determiner 25 determines pixel values for display on display portion 22 of lighting setting image 241, based on the input setting, and causes display portion 22 to display lighting setting image 241 using the determined pixel values.

Lighting setter 26 obtains the pixel values of pixels in lighting setting image 241 corresponding to the positions of luminaires 30 indicated by luminaire position information 242, determines a lighting setting value which is a setting value for at least one of dimming or toning of each luminaire 30, based on the obtained pixel values, and outputs the determined lighting setting value. The output lighting setting value is transmitted by communication circuit 21 to controller 40.

Pixel value determiner 25 and lighting setter 26 are realized by means of processor 250 reading and executing a program from storage device 240. In this program, the following are described: to obtain the position information of each luminaire 30 with reference to luminaire position information 242; to obtain the pixel values of the pixels included in lighting setting image 241 and located at the positions indicated by the obtained position information; and to determine lighting setting value of corresponding luminaire 30, based on the pixel values, for example, using a predetermined mathematical expression or conversion table. Processor 250 is typically a central processing unit (CPU). When lighting setting apparatus 20 further includes another microprocessor, pixel value determiner 25 and lighting setter 26 may be realized by means of the CPU and the other microprocessor cooperating with each other.

[2. Procedure from Setting of Lighting Mode to Control of Luminaires]

Figure 6:
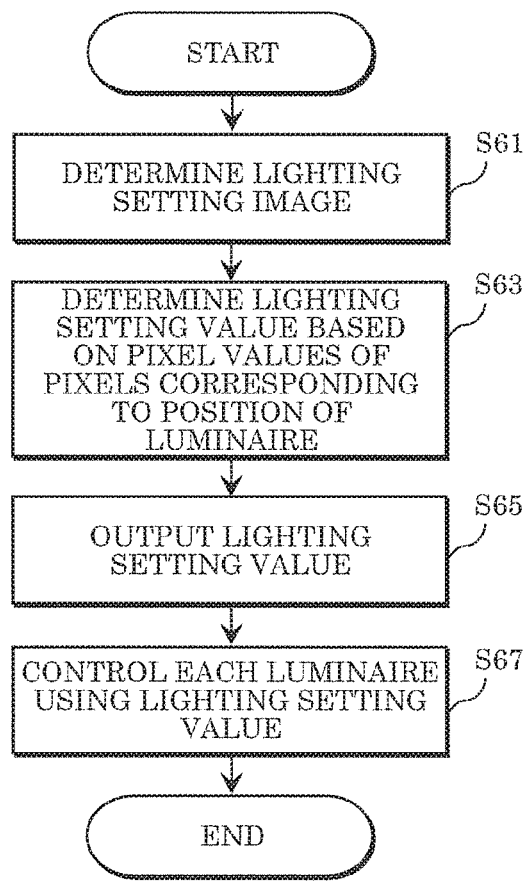
FIG. 6 is a flowchart of respective steps executed in the above-described lighting system starting with setting lighting modes in luminaires and ending with controlling the luminaires based on the settings.

Next, a procedure from setting of a lighting mode of luminaire 30 and control of luminaire 30 based on the setting executed in lighting system 10 is described. FIG. 6 is a flowchart of steps starting with the setting of the lighting mode in luminaire 30 and the control of luminaire 30 based on the setting.

First, on lighting setting apparatus 20, the user determines, as lighting setting image 241 to be used, a lighting setting image selected from lighting setting images stored in storage 24 or a lighting setting image which the user has newly created or modified from the selected lighting setting image and saved (Step S61).

Next, lighting setter 26 determines a lighting setting value, based on the pixel values of pixels which are included in the pixels of lighting setting image 241 to be used and located correspondingly to the position of luminaire 30 (Step S63). For example, lighting setting apparatus 20 includes a mathematical expression or a conversion table for obtaining, from the pixel values, the lighting setting value for generating illumination light which represents (i) the colors of light emitted from the pixels or (ii) colors corresponding to color phases or color temperatures that are very close to the colors of the light emitted from the pixels, and lighting setter 26 determines the lighting setting values using the mathematical expression or the conversion table. The determined lighting setting value is output from lighting setting apparatus 20 through communication circuit 21 (Step S65).

Controller 40 obtains the lighting setting value output from lighting setting apparatus 20, and generates a control instruction for causing luminaire 30 to emit light based on the setting value. Controller 40 controls target luminaire 30 by transmitting the control instruction to target luminaire 30 (Step S67).

In this procedure, the determination of a lighting setting image in Step S61 corresponds to a user operation for setting a specific lighting mode. Hereinafter, a series of specific examples of operation screens to be presented to the user in Step S61 are described. Each operation screen is a constituent element of input receiver 23, and is for presenting lighting setting images and receiving user inputs.

[3. Specific Example of Operation Screen]

Each of FIG. 7 to FIG. 10 is a diagram illustrating an example of an operation screen for allowing the user to set lighting modes in luminaires 30, displayed on display portion 22 of lighting setting apparatus 20. Some of these drawings illustrate an example of lighting setting image 241. Hereinafter, an input from the user received on each operation screen and lighting setting image 241 are described.

Figure 7:
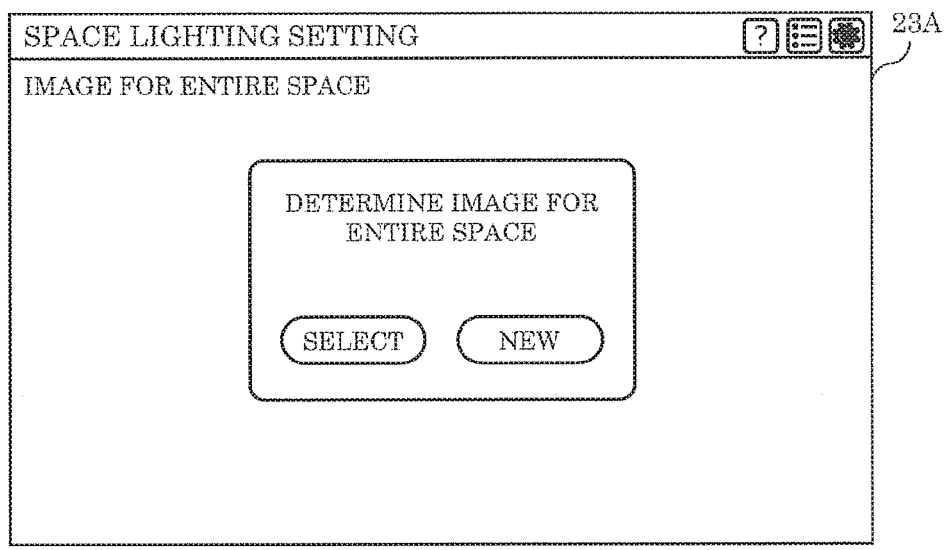
FIG. 7 is a diagram illustrating an example of an operation screen for allowing a user to set lighting modes in luminaires, displayed by the lighting setting apparatus according to the embodiment.

Operation screen 23A illustrated in FIG. 7 is an operation screen to be displayed in response to a request from the user. For example, when the user activates predetermined application software for setting luminaires 30 on a tablet computer and the tablet computer starts to function as lighting setting apparatus 20, the operation screen is displayed on the display of the tablet computer. A user input regarding whether to select lighting setting image 241 to be used from lighting setting images 241 stored in storage 24 or to newly create lighting setting image 241 is received through operation screen 23A. It is to be noted that determination of lighting setting image 241 is paraphrased as determination of an image for the entire space in the dialog box in operation screen 23A as an expression for users. This is because the brightness and color temperature of light at each place in the illumination space of lighting system 10 are determined according to lighting setting image 241 determined using lighting setting apparatus 20, and affect the atmosphere of the space.

Figure 8A:
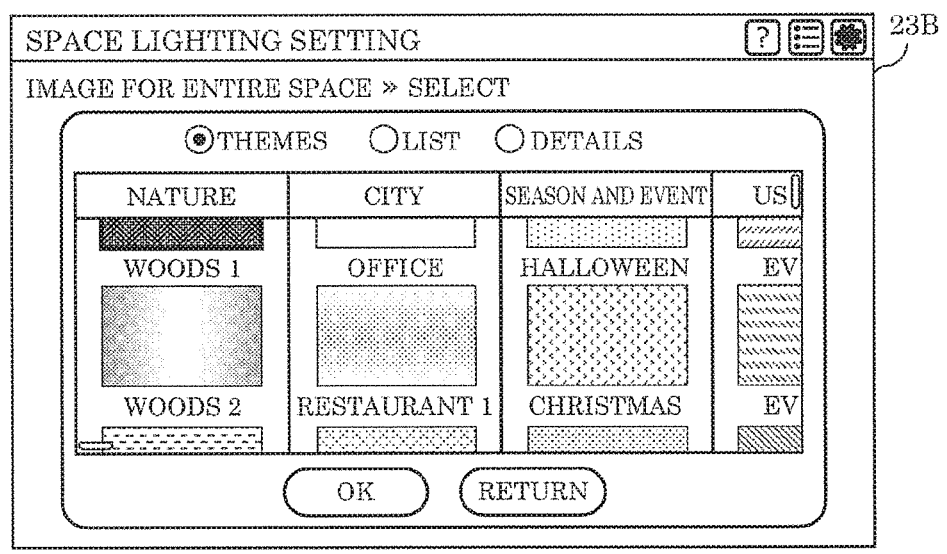
FIG. 8A is a diagram illustrating an example of an operation screen for allowing a user to set lighting modes in luminaires, displayed by the lighting setting apparatus according to the embodiment.

When the user selects "SELECT" on operation screen 23A, operation screen 23B illustrated in FIG. 8A is displayed next. On operation screen 23B, thumbnails of the plurality of lighting setting images 241 stored in storage 24 are displayed by theme. In the illustrated example, the thumbnails are given names such as "WOODS 1" and "OFFICE" according to an atmosphere of a lighting mode based on each lighting setting image 241 or the place suitable for the lighting mode based on each lighting setting image 241. Thumbnails of lighting setting images 241 created and stored in storage 24 by the user in the past may also be displayed on operation screen 23B. It is not essential to display thumbnails of lighting setting images 241 on operation screen 23B. For example, only the names of lighting setting images 241 may be listed in a predetermined order and presented to the user. Alternatively, (i) at least one of the thumbnails or names and (ii) details including descriptions regarding either lighting modes (such as the numerical values of color temperatures and outputs) which are set for luminaires 30 in each lighting setting image 241 or an atmosphere of each of the lighting modes may be presented to the user. The thumbnails in FIG. 8A are patterned with lines or dots. These patterns are used not to show that an actual lighting setting image has the pattern but to show that each of the thumbnails has at least one of a color or a brightness. The pattern differences between the thumbnails show that the colors and brightnesses are different between the thumbnails.

A user input for selecting lighting setting image 241 is received through operation screen 23B. For example, the user selects lighting setting image 241 by tapping the thumbnail thereof. Lighting setting image 241 may then be determined by the user selecting "OK" while one of the thumbnails of lighting setting images 241 is being selected. Alternatively, when "OK" is selected, operation screen 23B may transition to an operation screen which shows magnified lighting setting image 241 selected on operation screen 23B, and receive a user input for confirmation of the selection or customization of selected operation screen 23B. Customization is not described here because customization can be executed as necessary on operation screens similar to later-described operation screens for newly creating lighting setting images 241.

Figure 8B:
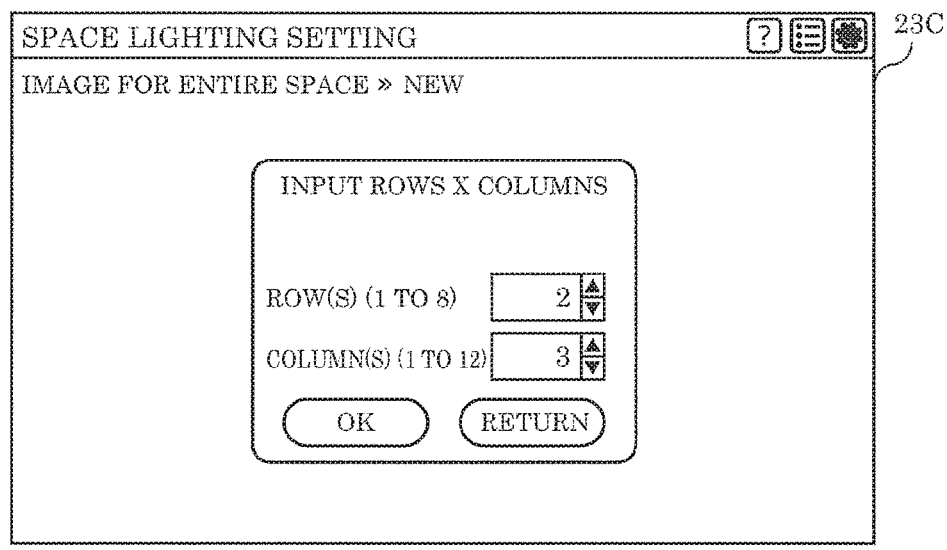
FIG. 8B is a diagram illustrating an example of an operation screen for allowing a user to set lighting modes in luminaires, displayed by the lighting setting apparatus according to the embodiment.
Figure 9A:
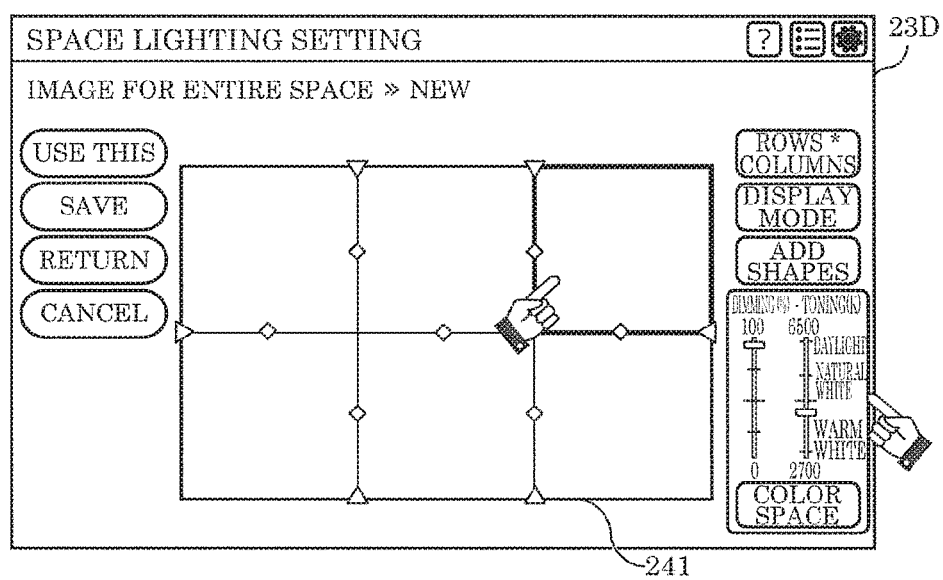
FIG. 9A is a diagram illustrating an example of an operation screen for allowing a user to set lighting modes in luminaires, displayed by the lighting setting apparatus according to the embodiment.

FIG. 8B illustrates operation screen 23C which is displayed next when the user selects "NEW" (which means "create a new one") on operation screen 23A. Operation screen 23C receives a user input regarding dividing new lighting setting image 241 into a plurality of subareas. As illustrated in FIG. 8B, when "OK" is selected on operation screen 23C where 2 is input as the number of rows and 3 is input as the number of columns, operation screen 23C transitions to operation screen 23D which displays lighting setting image 241 as illustrated in FIG. 9A. Lighting setting image 241 represents the entire illumination area of luminaires 30 in the space where luminaires 30 are installed. The subareas obtained as a result of the division are examples of first subareas according to this embodiment. Graphical symbol of hands in some of the drawings starting with FIG. 9A are not objects displayed on operation screens. The hand symbols show exemplary locations at which the user performs input operations, and arrows show hand motions for the input operations.

Lighting setting image 241 receives an input for setting a color or a brightness for each of the subareas of lighting setting image 241. For example, on operation screen 23D, lighting setting image 241 includes six rectangular subareas obtained by dividing lighting setting image 241 into a matrix. The user selects one or more of the subareas by tapping. In the example in FIG. 9A, a thick frame shows that an upper right subarea is being selected.

Next, in the state where any of the subareas is being selected in this way, the user inputs a setting of at least one of a color or a brightness of the selected subarea using, for example, a slider displayed at the lower right of operation screen 23D. Methods for inputting a setting of at least one of a color or a brightness is not limited to such a method using a slider. For example, the setting may be performed by inputting a numerical value or specifying a color on a color space chart showing colors which can be reflected to the color temperature of light to be emitted from luminaire 30. While lighting setting image 241 is being displayed in this way, a user setting of at least one of a color or a brightness of lighting setting image 241 is received. Based on the input setting, pixel value determiner 25 determines the pixel values of pixels for display on display portion 22 of lighting setting image 241, and causes display portion 22 to display lighting setting image 241 using the determined pixel values.

Figure 9B:
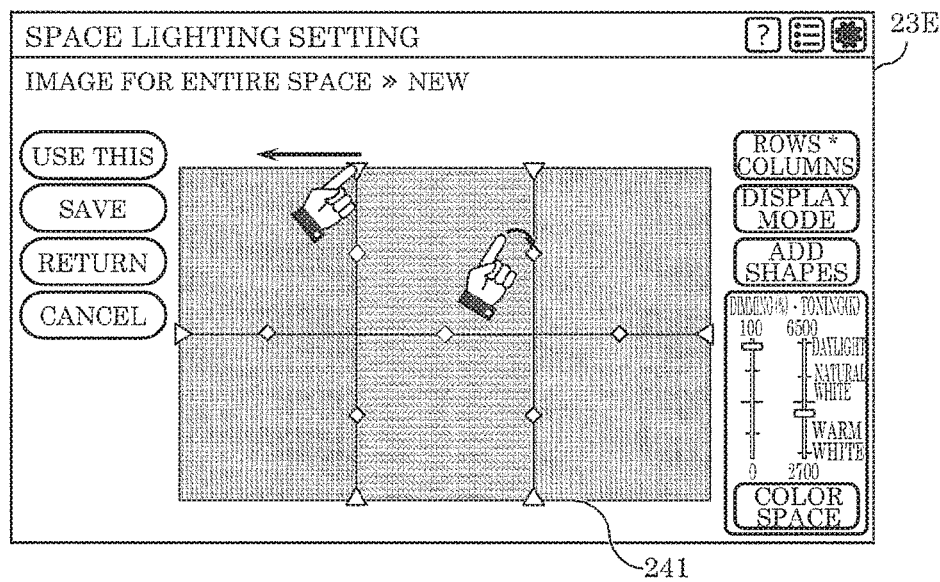
FIG. 9B is a diagram illustrating an example of an operation screen for allowing a user to set lighting modes in luminaires, displayed by the lighting setting apparatus according to the embodiment.

FIG. 9B illustrates operation screen 23E as an example of an operation screen which includes lighting setting image 241 using the pixel values determined in this way and is displayed on display portion 22. As in the case of thumbnails in FIG. 8A, patterns of lines or dots are shown in each of the subareas. The patterns are used not to show that an actual lighting setting image has the pattern but to show that the subarea displayed has a certain color or a certain brightness. The pattern differences between the subareas show that the colors and/or brightnesses are different. In the example of FIG. 9B, a common setting has been made for the two columns of the right one and the left one, and a different setting has been made for the center column. The user may save lighting setting image 241 in this state in storage 24, determine lighting setting image 241 to be used, or may add further modifications. The graphical symbols of hands and the arrows in FIG. 9B show examples of places at each of which the user performs an operation to make such modifications on lighting setting image 241 and the direction of motion in the operation.

One of these modification examples is shifting of the position of a boundary (or a change in the ratio of the sizes of the subareas). This modification operation is exemplified by the hand and the arrow at the upper left of lighting setting image 241 in FIG. 9B. More specifically, the user can shift the boundary within a shiftable range by drugging a triangle displayed at the end of the boundary. In the example of FIG. 9B, lighting setting image 241 has two boundaries dividing lighting setting image 241 into equal-sized three columns, and a setting is being input by shifting the position of the left one of the boundaries leftward.

Figure 9C:
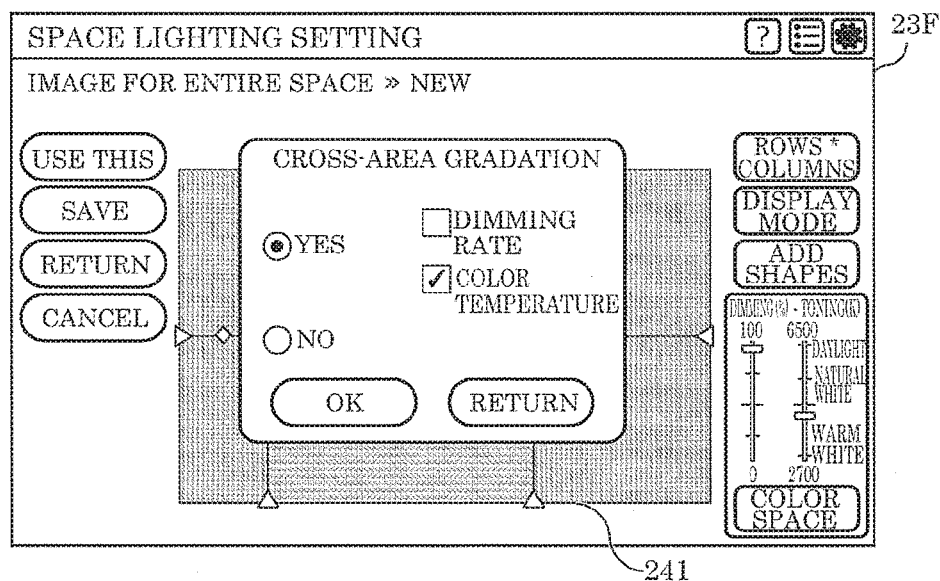
FIG. 9C is a diagram illustrating an example of an operation screen for allowing a user to set lighting modes in luminaires, displayed by the lighting setting apparatus according to the embodiment.

In addition, a modification for gradually changing at least one of color or brightness between a plurality of continuous subareas may be added. This modification operation is exemplified by the hand and the arrow in the vicinity of a rhomboid on the boundary between the center column and the right column in lighting setting image 241 in FIG. 9B. More specifically, by means of the user pressing the rhomboid (tapping or holding down the rhomboid) on the boundary, the user can open an operation screen for inputting the setting for the gradation in the plurality of continuous subareas on both sides of the boundary. FIG. 9C illustrates an example of the operation screen.

A dialog box in FIG. 9C receives an input for selecting whether to make gradation between the two subareas or not, and when gradation is to be made, further receives an input for selecting whether to make gradation in each of color and brightness. The color and brightness of lighting setting image 241 correspond to the color temperature and dimming rate of luminaire 30, respectively. Thus, in the example of FIG. 9C, the user is requested to input whether to make gradation in color temperature and dimming rate instead of the color and brightness of the subarea, respectively. In response to this, the user inputs a setting for making gradation in color temperature.

Figure 9D:
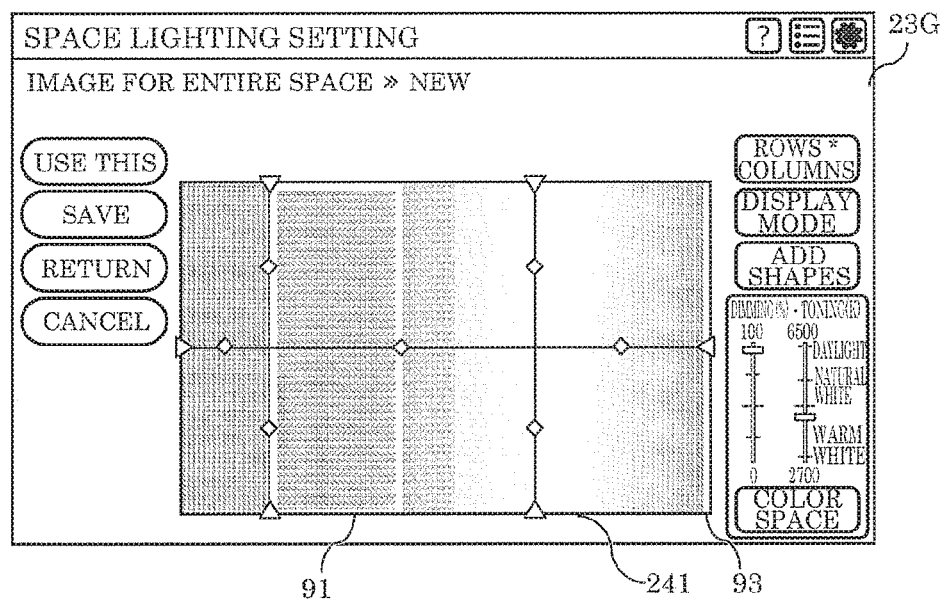
FIG. 9D is a diagram illustrating an example of an operation screen displayed by the lighting setting apparatus according to the embodiment, for allowing the user to set the lighting modes in the luminaires.

FIG. 9D illustrates an example of lighting setting image 241 which has pixel values determined by pixel value determiner 25 based on the setting input as exemplified in FIGS. 9B and 9C and is displayed. As a result of the shifting of the boundaries, the leftmost column subarea is smaller than before, and the center column subarea is wider than before correspondingly. In addition, there is a range whose appearance gradually changes across the boundary between the center column subarea and the right column subarea. The range has been generated as a result that pixel value determiner 25 determined that the pixel values of the pixels in the area are gradually changed across the boundary based on the colors set in the areas that share the boundary. It should be noted that the gradual color change in lighting setting image 241 is represented by gradual change in dots or patterns in the areas in FIGS. 9D, 9E to 9H, and 10.

In addition, for the user's convenience in confirming the range in which color or brightness is changed by changing the setting, a range in which the color and brightness before the setting of the gradation is made is maintained may be displayed. In the example of FIG. 9D, this range is displayed using white frame 91 and white line 93. Figures or symbols used for the display of this range are not limited to such a white frame and white line. Any easy-to-see figure or symbol against lighting setting image 241 can be used suitably. Alternatively, animation such as blinking of a frame or a line may be used. The presence or absence of the range to indicate an area where the color and brightness is maintained may be switched arbitrarily by the user. The pixel values for displaying such figures or symbols used for the display of this range are not used by lighting setter 26 to determine any lighting setting value.

Figure 9E:
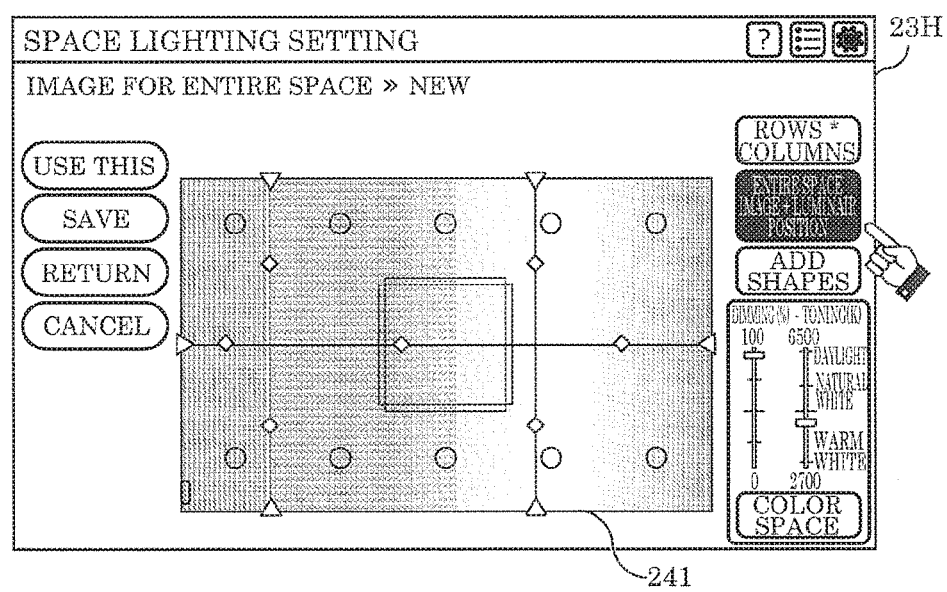
FIG. 9E is a diagram illustrating an example of an operation screen for allowing a user to set lighting modes in luminaires, displayed by the lighting setting apparatus according to the embodiment.

In the series of steps for setting lighting modes, display portion 22 of lighting setting apparatus 20 may display not only lighting setting image 241 but also the position of each luminaire 30 in the predetermined space indicated by lighting setting image 241, that is, an image showing the position of luminaire 30 (hereinafter referred to as luminaire position image). The luminaire position image is an image which shows the position of each luminaire 30 indicated by luminaire position information 242 illustrated in FIG. 5 on a figure having the same shape as lighting setting image 241 representing the entire illumination area, and is stored in storage 24 as part of luminaire position information 242. FIG. 9E is a diagram illustrating an example of a display mode of a luminaire position image. In operation screen 23H for this example, lighting setting image 241 and the luminaire position image are superimposed and displayed in such a manner that positions in a predetermined space indicated by lighting setting image 241 and the positions of luminaires 30 in the space indicated by the respective luminaire position image match each other. In this way, the user can set colors and brightnesses in lighting setting image 241 considering the positions of luminaires 30 in the space. In the example of FIG. 9E, each luminaire position image shows the shape (or type) of a corresponding one of luminaires 30 in addition to the position thereof. Such information may be obtained from a figure or an image used to calculate position information of each luminaire 30, or may be based on a user input. The positions of pixels whose pixel values are used to determine a lighting setting value for each luminaire 30, that is, the position corresponding to the coordinates of each luminaire 30 indicated by luminaire position information 242 may be displayed using a symbol such as a cross.

For example, the user can display operation screen 23H in FIG. 9E by tapping a button for switching display modes of lighting setting image 241 on any of the operation screens for creating new lighting setting image 241 according to this embodiment. When the button is tapped, pixel value determiner 25 causes display portion 22 to superimpose and display lighting setting image 241 and a luminaire position image.

Although the setting of the at least one of the color or the brightness has been made for rectangular subareas arranged in a matrix in lighting setting image 241 in the above descriptions, a subarea for which at least one of a color or a brightness can be set and which has a higher flexibility in position and shape may be added to lighting setting image 241. Each of FIGS. 9F and 9G is a diagram illustrating an example of the subarea and an operation screen for adding the subarea.

Figure 9F:
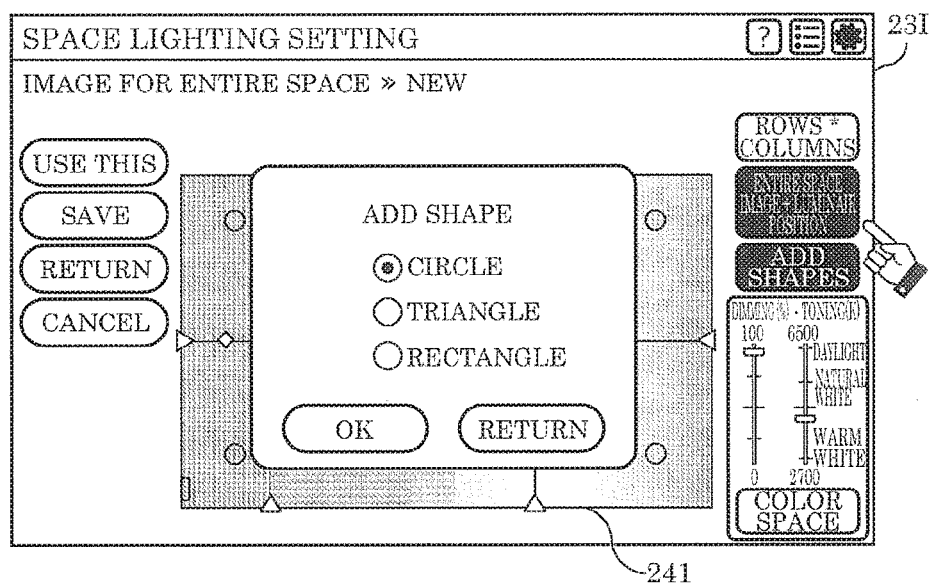
FIG. 9F is a diagram illustrating an example of an operation screen for allowing a user to set lighting modes in luminaires, displayed by the lighting setting apparatus according to the embodiment.
Figure 9G:
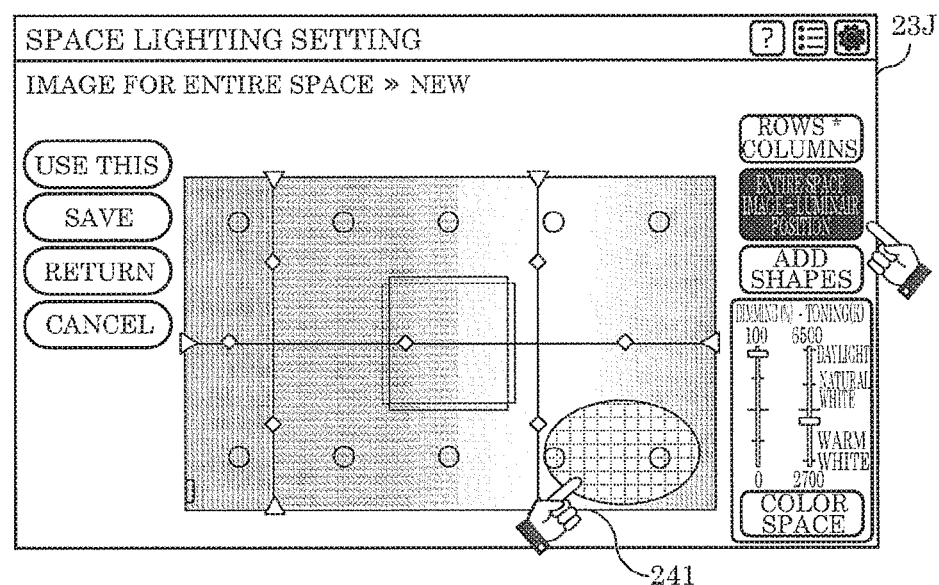
FIG. 9G is a diagram illustrating an example of an operation screen for allowing a user to set lighting modes in luminaires, displayed by the lighting setting apparatus according to the embodiment.

For example, the user can display operation screen 23I in FIG. 9F by tapping a button for activating a dialog box for adding a subarea (represented as "SHAPES") on any of the operation screens for creating new lighting setting image 241 according to this embodiment. When the user selects the shape of a figure to be added and selects "OK" in the dialog box for adding the figure on operation screen 23I, the figure having the selected shape is placed in lighting setting image 241. Operation screen 23J illustrated in FIG. 9G is an example of an operation screen obtained by selecting a circle as the figure as illustrated in FIG. 9F, and superimposing and arranging the circle on one of rectangular subareas. The user may change the position, size, and aspect ratio of the arranged figure, or may rotate it. In the example of FIG. 9G, an oval shown at the lower right of lighting setting image 241 is a figure added by the user. The subarea occupied by the added figure is an example of a second subarea according to this embodiment. The addition of the second subarea enables a simple setting of a local lighting mode.

The user inputs the setting of the at least one of the color or the brightness of the subarea occupied by the added figure using a slider displayed at the lower right of operation screen 23C, in the same manner as the case of the rectangular subarea in FIG. 9A. Pixel value determiner 25 uses the setting of the at least one of the color or the brightness arranged in this way preferentially over the setting of the at least one of the color or the brightness which has been already set for the rectangular subarea. In other words, in the example of FIG. 9G, neither the setting of the color nor the setting of the brightness which has been input for the rectangular subarea is used to determine the pixel values of the pixels within the subarea occupied by the oval arranged at the lower right of lighting setting image 241. Pixel value determiner 25 determines the pixel values of pixels based on the setting input by the user as the setting of the at least one of the color or the brightness of the oval. The lighting setting value of luminaire 30 located at the position corresponding to this subarea is determined based on the pixel values of the pixels in this oval subarea.

The user can save, in storage 24, lighting setting images 241 created on the above-described operation screens such as lighting setting images 241 illustrated in FIGS. 9B, 9D, 9E, and 9G, and determine them to be lighting setting images 241 to be used. Subsequently, Step S63 and the following steps in the flowchart of FIG. 6 are executed using each of determined lighting setting images 241. Accordingly, the user can easily set the lighting modes in the plurality of luminaires 30 without taking the trouble to group the plurality of luminaires 30 into groups.

For a user who would like to adjust at least one of the dimming rate of each luminaire 30 or the color temperature of emission light more precisely, at least one of the dimming rate or the numerical value indicating the color temperature may be superimposed and displayed on a luminaire position image. Operation screen 23K illustrated in FIG. 9H is an example of such a display mode.

In this example, lighting setting values for dimming and toning which have been set by lighting setter 26 in each luminaire 30 are displayed based on the pixel values of the pixels in lighting setting image 241 illustrated in FIG. 9G. In addition to the setting values, a color that simulates the set lighting mode is provided in the drawing showing each luminaire 30. Among five circular downlights (luminaires 32) illustrated as circles arranged at the upper side of the luminaire position image, the differences between the color temperatures of the three luminaires 32 located at the right side reflect the result of color gradation which has been set as illustrated in FIG. 9D. This also applies to the color temperature of a straight-tube LED lamp (luminaire 34) located at the center of the luminaire position image. Each of two luminaires 34 located at the lower right of the luminaire position image has lighting setting values that reflect the settings of the color and the brightness of the oval arranged as illustrated in FIG. 9G, and thus has setting values different from those of luminaire 34 located above and thus are different from those of the setting values of each luminaire 34 located above.

Operation screen 23K may be displayed, for example, by means of the user tapping the button for switching the display modes when operation screen 23J in FIG. 9G is being displayed. Subsequently, when the user taps the button again, a return is made from operation screen 23K to operation screen 23J. Alternatively, an operation screen such as operation screen 23K may be used as an operation screen for confirmation which is displayed when the user taps a button of "USE THIS".

Figure 9H:
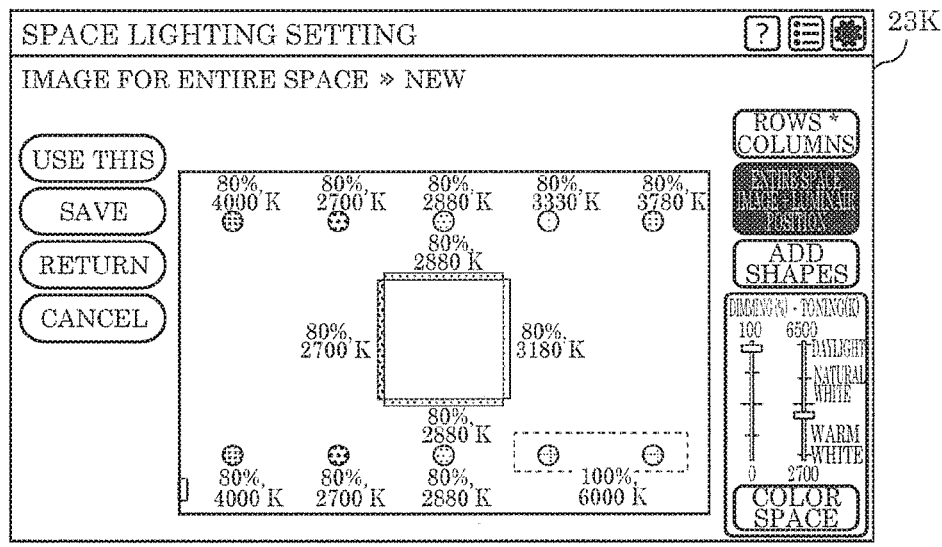
FIG. 9H is a diagram illustrating an example of an operation screen for allowing a user to set lighting modes in luminaires, displayed by the lighting setting apparatus according to the embodiment.

It is to be noted that display of lighting setting values is not limited to the style as illustrated in FIG. 9H. For example, on operation screen 23H in FIG. 9E or operation screen 23J in FIG. 9G, lighting setting values may be displayed in response to an operation which is for example holding down or double tapping of the figure indicating each luminaire 30, or may be activated from a context menu. In addition, lighting setting values may also be always displayed when a luminaire position image is displayed.

[4. Use of Lighting Setting Images at a Plurality of Places]

Lighting setting images 241 described above can be used at a plurality of places. This makes it easier to provide lighting effects such as providing a common atmosphere at the plurality of places represented by a plurality of shops in the same franchise chain. Furthermore, it is possible to reduce the trouble to set lighting modes even at a plurality of places at each of which the number and arrangement of luminaires are different from those at the other places. This is explained using an example.

Figure 10:
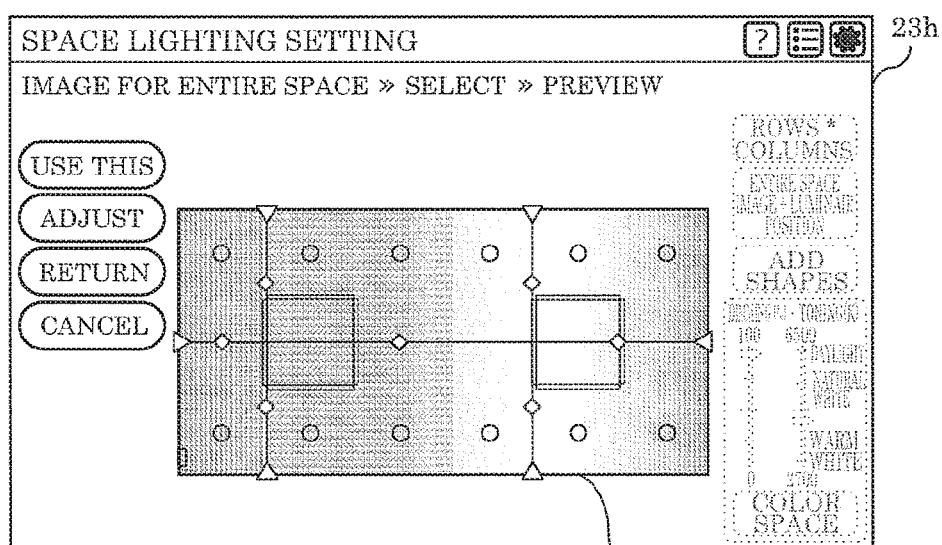
FIG. 10 is a diagram illustrating an example of an operation screen for allowing a user to set lighting modes in luminaires, displayed by the lighting setting apparatus according to the embodiment.

FIG. 10 is a diagram illustrating an example of an operation screen displayed when the user is setting a lighting mode using lighting setting image 241 illustrated in FIG. 9E on lighting setting apparatus 20 in a space (hereinafter a second space) located at a place different from a space (hereinafter a first space) at which the settings of the lighting modes have been made in the above descriptions.

The second space has a stretched shape compared to the first space. As to the number of luminaires 30 installed, the second space has two more luminaires 32 (represented as circles in FIG. 10) and four more luminaires 34 (represented as elongated rectangles in FIG. 10) than the first space. However, there is no need to group luminaires 30 into groups also for the second space.

More specifically, the user copies and saves lighting setting image 241 in the state illustrated in FIG. 9E in storage 24 of lighting setting apparatus 20 that is to be used to set a lighting mode for the second space. The user can set the lighting mode similar to the lighting mode in the first space to luminaire 30 in the second space by selecting lighting setting image 241 on the operation screen of FIG. 8A displayed when setting the lighting mode for the second space and determining selected lighting setting image 241 as lighting setting image 241 to be used for the second space.

FIG. 10 illustrates an operation screen 23h which is an example of an operation screen for confirmation which is displayed before the determination. The difference in the aspect ratios between the spaces may be adjusted automatically or through a user operation. Alternatively, lighting setting image 241 may be customized (adjusted) on the operation screen. In the example of FIG. 10, when a button of "ADJUST" at the left side of operation screen 23h is tapped, various kinds of operation buttons for adjustment at the right side of operation screen 23h are made available.

(Variations Etc.)

Hereinafter, the lighting setting apparatus according to the present disclosure has been described based on the above embodiment, the present disclosure is not limited to the embodiment. The present disclosure covers embodiments which can be obtained by adding various kinds of modifications that a person skilled in the art would arrive at or other embodiments which can be configured by combining some of the constituent elements in the embodiment.

For example, the details of luminaire position information 242 are not limited to the information of the items indicated by column labels in FIG. 5. For example, the details may include information on specifications of each luminaire 30, such as a model, a shape, dimensions, and a variable range of color temperatures of emission light. Lighting setter 26 may cause display portion 22 to display such information on specifications to the user when, for example, a color temperature set by lighting setter 26 based on the pixel value of a pixel of lighting setting image 241 cannot be output by luminaire 30 located at the position corresponding to the pixel.

It is inessential for the user to input a matrix size (the numbers of rows and columns) illustrated in FIG. 8B at the time when a lighting setting image is newly created. For example, lighting setting image 241 is initially set to have one row and one column. Lighting setting image 241 which is a single area as a whole may be always displayed when lighting setting image 241 is newly created. The user can divide lighting setting image 241 as necessary. Alternatively, the settings of the matrix size in lighting setting image 241 which has been newly created and saved may be reused when another one is newly created next. In addition, settings other than the matrix size such as settings of colors and brightnesses may be input when creation of new lighting setting image 241 is started.

The shape of lighting setting image 241 is not limited to the rectangles as illustrated in FIG. 9A etc. Any other shapes such as a circle, an oval, a polygon other than the rectangles, a sector, an L-shape, and a shape defined by a user are possible. Alternatively, the shape of lighting setting image 241 may be determined based on a plan view or an image for a space in which luminaires 30 are installed. Such a shape may be selected when selecting or newly creating lighting setting image 241, or the shape of lighting setting image 241 may be changed after lighting setting image 241 is selected or newly created. In this way, the range of variation in the shape of a space which can be used to set lighting modes is widened for single lighting setting image 241.

The shapes of the subareas obtained by dividing lighting setting image 241 are not limited to rectangles illustrated in FIG. 9A etc. For example, hexagonal subareas whose interior angles are all 120 degrees are also possible. If lighting setting image 241 is a plane image, the hexagonal subareas can fill lighting setting image 241 without any gaps in the same manner as the rectangles, and thus color and brightness settings are fully made for the entirety of lighting setting image 241. Accordingly, the lighting mode of each luminaire 30 installed at anywhere in the space is set based on the pixel values determined by pixel value determiner 25. For example, lighting setting image 241 having a circular shape can be divided into fewer subareas having non-rectangular shapes than when divided into rectangular subareas. Settings are less troublesome when the number of subareas is fewer, and a setting for gradation is made more easily in outer subareas closer to the outline of lighting setting image 241 than to the center.

In addition, shifting of boundaries that divide lighting setting image 241 into a plurality of subareas does not always need to be made on a per column basis or on a per row basis as illustrated in FIG. 9B. The ratio between the sizes of the subareas may be changeable in each row and/or each column.

In addition, lighting setting image 241 selected from among lighting setting images 241 stored in storage 24 may be determined as lighting setting image 241 to be used without being displayed in the form of a thumbnail. For example, when lighting setting image 241 to be used is the one already used by the user before or the one generated by the user, no problem arises when the user selects lighting setting image 241 to be used based only on the name displayed in a list. In other words, the user may have lighting setting image 241 displayed on lighting setting apparatus 20 at the discretion of the user when the user would like to confirm or change the settings of the lighting modes.

Figure 11:
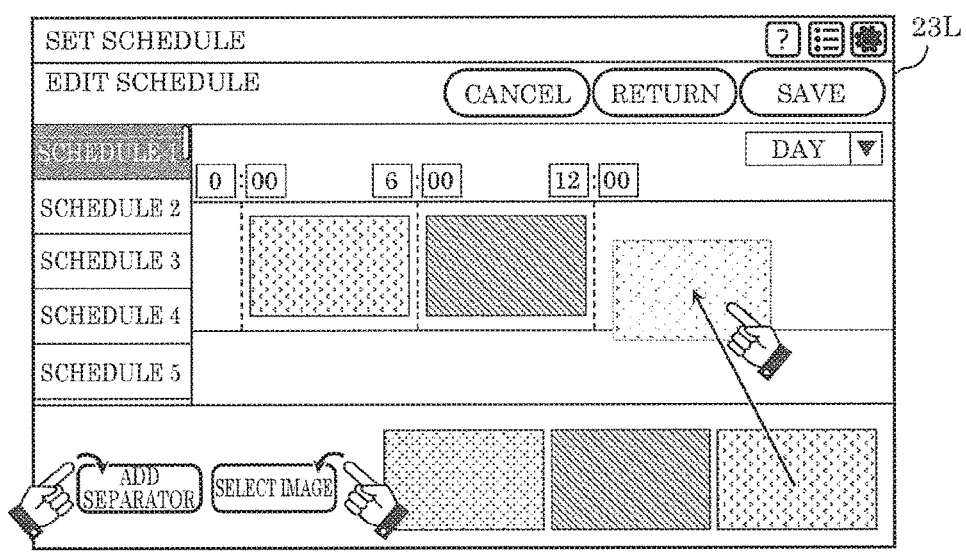
FIG. 11 is a diagram illustrating an example of an operation screen for allowing the user to make a setting for scheduling of lighting modes in the luminaires, displayed by the lighting setting apparatus according to the embodiment.

Lighting setting apparatus 20 may receive an input of a setting regarding scheduling of lighting modes in a predetermined space, determine the setting value regarding the scheduling based on the input, and output the determined setting value. Operation screen 23L illustrated in FIG. 11 is an example of an operation screen for allowing the user to input the setting regarding the scheduling. Hereinafter, a description is given of a specific example of an operation for inputting the setting regarding the scheduling, performed using lighting setting image 241 with reference to FIG. 11.

First, the user selects a schedule to be edited. "SCHEDULE 1" is selected at the left end of operation screen 23L. When the schedule is selected, an editable time chart is displayed to the right. For example, when the schedule to be edited is selected for the first time, empty time chart may be displayed to the right. The time length corresponding to the time chart may be changed. The time length of the time chart is set to "DAY" in the example of FIG. 11. The user can create a one-day schedule or a diel schedule of lighting modes using operation screen 23L in this state.

Next, the user taps a button of "SELECT" to select lighting setting images 241 to be used in a schedule to be edited, or "SCHEDULE 1" in the example of FIG. 11, from among lighting setting images 241 stored in storage 24. Thumbnails of selected lighting setting images 241 are arranged side by side to the right of the "SELECT" button. In the example of FIG. 11, three lighting setting images 241 are selected. Image names as illustrated in FIG. 8A may be displayed together with the thumbnails.

Next, the user drugs and arranges the thumbnails in the time chart. Each time the user taps a button of "ADD SEPARATOR", a separator is added to the time chart. In the example of FIG. 11, broken lines are separators in the time chart. Time indicated by each separator is displayed above the separator, and this time can be changed through an input by the user. Each of lighting setting images 241 arranged in the time chart is valid in the time period sandwiched by two of the separators. In other words, the lighting setting value determined by lighting setter 26 based on the pixel values of the pixels of each lighting setting image 241 is applied to each luminaire 30 in the time period corresponding to the position of lighting setting image 241 in the time chart.

When the user taps a button of "SAVE", the schedule having the details indicated by the time chart at that time is saved. The schedule may become valid at the time of the saving. Furthermore, another operation screen may be provided for receiving a user input for selecting and validating the schedule.

In this way, input receiver 23 receives inputs of settings of time periods in which lighting setting values determined by lighting setter 26 based on the pixel values of each of the plurality of lighting setting images 241 are applied to luminaires 30. Lighting setter 26 determines the lighting setting value for each time period according to the setting regarding the time which has been input, and outputs the determined lighting setting value.

Operation screens for scheduling lighting modes are not limited to the example in FIG. 11. Any other operation screen is possible as long as the operation screen is configured to receive an input operation for selecting lighting setting image 241 and an input of a time period during which the pixel values of selected lighting setting image 241 are reflected to the settings of the lighting modes.

Operations for scheduling lighting modes and details which can be set are not limited to the example of operation screen 23L described above. For example, lighting setting image 241 may be arranged in the time chart directly from a list of lighting setting images 241 stored in storage 241. In addition, settings (instantaneous switching, cross fading that takes a predetermined time, etc.) regarding switching of lighting modes may be possible. A plurality of lighting setting images 241 may be arranged between separators. It is also possible to make settings for alternately applying the plurality of lighting setting images 241 in a short cycle such as for every several minutes in the time periods indicated by these separators.

In the above descriptions and the drawings which have been referred to, each lighting setting images 241 has been described to be the plane image in the case where the predetermined space in which luminaires 30 are arranged is seen in the plan view. However, lighting setting images 241 are not limited to such an image. For example, when luminaire 30 is installed on a wall inside a space, lighting setting image 241 which is a front view image of the wall may further be used. In this way, it is possible to set lighting modes separately for luminaires 30 installed on the ceiling and for luminaire 30 installed on the wall. Alternatively, lighting setting image 241 may be a three-dimensional image. In this case, lighting setting image 241 is divided into, for example, cuboids.

Lighting setting apparatus 20 and controller 40 may be configured on a single system including the following elements illustrated in FIG. 4: either a single general or an exclusive computer or at least one processor, a storage device, and a display.

The hardware configuration described in the above embodiment is a mere example. Input receiver 23 may be implemented using one of various kinds of input devices such as a pointing device or keyboards, or using a microphone for sound input. For example, lighting setting image 241 may be selected by inputting the name of lighting setting image 241 by speech.

[5. Effects]

As described above, lighting setting apparatus 20 according to this embodiment which is used to set lighting modes in a plurality of luminaires 30 installed in a predetermined space includes: storage 24 which stores lighting setting image 241 and luminaire position information 242; input receiver 23 which receives a user input regarding use of the lighting setting image; and lighting setter 26. Lighting setting image 241 is an image indicating the entirety of an illumination area of the plurality of luminaires 30 in the predetermined space. Luminaire position information 242 indicates the positions of the plurality of luminaires 30 in the predetermined space, in association with lighting setting image 241. Lighting setter 26 obtains the target pixel values of target pixels that are of lighting setting image 241 and are located correspondingly to the positions of the plurality of luminaires 30 indicated by luminaire position information 242, determines, based on the obtained target pixel values, a lighting setting value for at least one of dimming or toning of each of the plurality of luminaires 30, and outputs the determined lighting setting value.

In this way, the user determines, as the image to be used, the image which represents the entirety of the predetermined space and is a figure for which at least one of a color or a brightness has been set. Thus, the user can make the setting of the at least one of the dimming or the toning of the plurality of luminaires 30 in the same space. The user of lighting setting apparatus 20 does not need to group the plurality of luminaires 30 into groups and to set scenes for each of the groups when introducing lighting system 10 or installing additional luminaire(s) 30. Accordingly, an operational burden for setting lighting modes placed on the user is reduced. In addition, the user can easily grasp the atmosphere of the lighting modes on the entire space, and thus setting trial and error is less likely to occur. Lighting setting image 241 does not depend on the configuration such as the number, arrangement, or the like of luminaires 30 at respective places, and thus is easily used at spaces in which the number, arrangement etc. of luminaires 30 vary.

For example, lighting setting apparatus 20 may include: display portion 22 which displays lighting setting image 241; and pixel value determiner 25 which determines pixel values for display on display portion 22 of lighting setting image 241. Input receiver 23 may further receive, from a user, an input regarding a setting of at least one of a color or a brightness in lighting setting image 241 while lighting setting image 241 is being displayed on display portion 22. Pixel value determiner 25 may determine the pixel values based on the setting input by the user, and causes display portion 22 to display lighting setting image 241 using the determined pixel values.

In this way, the user can customize at least one of a color or a brightness in lighting setting image 241. Lighting setter 26 re-determines one or more new lighting setting values based on the customized pixel values, and outputs the re-determined lighting setting value(s) to controller 40. In other words, the user can set the at least one of dimming or toning of the plurality of luminaires 30 in the space through the customization of lighting setting image 241.

For example, luminaire position information 242 includes a luminaire position image indicating the positions of the plurality of luminaires 30 in the predetermined space. Pixel value determiner 25 may cause display portion 22 to superimpose and display lighting setting image and the luminaire position image in such a manner that positions in the predetermined space shown in lighting setting image 241 and positions in the predetermined space shown in the luminaire position image match each other as illustrated in FIG. 9E or 10.

In this way, the user can determine or adjust lighting modes in the predetermined space while confirming the positions of luminaires 30. The lighting mode of each luminaire 30 depends on the pixel values of the pixels at the position corresponding to the position of luminaire 30 itself in lighting setting image 241. Thus, the user can create, precisely only taking less trouble, lighting setting image 241 based on which each luminaire 30 operates in the desired lighting mode.

For example, lighting setting image 241 includes a plurality of subareas, and input receiver 23 may input the setting of the at least one of the color or the brightness for each of a plurality of subareas in lighting setting image 241.

In this way, the user can set different lighting modes in the plurality of luminaires 30 in the predetermined space depending on the places in the predetermined space.

More specifically, for example, the plurality of subareas in lighting setting image 241 may include a plurality of first subareas which can be obtained by dividing lighting setting image 241. In this way, by inputting the setting of the at least one of the color or the brightness for each of the first subareas, the entirety of lighting setting image 241 has the settings of the colors and/or the brightnesses without leaving any no-setting subarea. Accordingly, a lighting mode is set in each luminaire 30 irrespective of the position of luminaire 30 in the predetermined space. Furthermore, once lighting setting image 241 created in this way is applied to a space, a lighting mode is set for every luminaire 30 in the space. For example, the first subareas are rectangular or hexagonal when lighting setting image 241 is a plane image.

For example, pixel value determiner 25 may determine the pixel values of the pixels included in continuous ones of the plurality of first subareas in such a manner that the pixel values gradually change across the boundaries between the continuous ones of the plurality of first subareas. Each of FIGS. 9D and 9E schematically shows an example of lighting setting image 241 which has the pixel values determined in this way and is displayed.

The user can set gradation in dimming, toning, or the both of luminaires 30 in the predetermined space by inputting the setting(s) for the gradation in color, brightness, or the both to lighting setting image 241. When such settings for gradation are made to a group of luminaires 30, it is sometimes difficult to proportionate the distances between luminaires 30 and the differences in the setting values of color temperatures. For example, the setting values as shown in FIG. 9H need to be calculated according to the distances between luminaires 30. In particular, the operational burden for a user is large when the distances between luminaires 30 are not equal. However, the use of lighting setting apparatus 20 eliminates such calculation. The user can set lighting modes including gradation in luminaires 30 in a range in which gradation is desired to be set by setting the gradation to the subarea of lighting setting image 241 corresponding to the range.

For example, the plurality of subareas may further include a circular or polygonal second subarea superimposed and placed by the user on the first subarea(s) at an arbitrary position of lighting setting image 241. Input receiver 23 may further receive a user input regarding a setting of at least one of a color or brightness onto the second area, and pixel value determiner 25 may determine pixel values in the second area based on the setting of the at least one of the color or the brightness in the second area.

In this way, the user can easily set different local lighting modes in lighting setting image 241.

For example, storage 24 may store a plurality of lighting setting images 241, and input receiver 23 may further receive a user input of a setting regarding a time period in which one of the plurality of lighting setting images 241 is applied. Lighting setter 26 may determine and output lighting setting values for each time period further according to the settings of the times which have been input.

In this way, it is possible to set scheduling of lighting modes based on the plurality of lighting setting image 241 using lighting setting apparatus 20.

The present disclosure can also be implemented as a lighting system including: a plurality of luminaires 30; and controller 40 which obtains lighting setting values to be output from lighting setting apparatus 20, and controls the plurality of luminaires 30 using the lighting setting values.

In this way, the user determines, as the image to be used, the image which indicates the entirety of the predetermined space and which represents a figure for which at least one of a color or a brightness has been set. Thus, the user can make settings for at least one of dimming or toning of the plurality of luminaires 30 in the same space. The user of lighting system 10 does not need to group the plurality of luminaires 30 into groups and to set scenes for each group when introducing lighting system 10 or installing additional luminaire(s) 30. Accordingly, an operational burden for setting lighting modes placed on the user is reduced. In addition, the user can easily grasp the atmosphere of the lighting modes on the entire space, and thus setting trial and error is less likely to occur. Lighting setting image 241 created in lighting system 10 does not depend on the configuration of luminaires 30 at each place. Thus, lighting system 10 can be easily used even if lighting system 10 is installed in another space in which the number and arrangement of luminaires 30 is different.

In addition, the present disclosure can be implemented as a method of controlling a plurality of luminaires 30. Specifically, the method includes: selecting a lighting setting images from one or more lighting setting images by a user input, or creating a lighting setting images by a user input, each of the one or more lighting setting images indicating an entirety of an illumination area of the plurality of luminaires 30 in a predetermined space in which the plurality of luminaires 30 are installed; obtaining target pixel values of target pixels of the lighting setting image, the target pixels being located at positions corresponding to positions of the plurality of luminaires 30 indicated by luminaire position information indicating positions of the plurality of luminaires 30 in the predetermined space in association with the one or more luminaire setting images; determining, based on the obtained target pixel values, a lighting setting value for at least one of dimming or toning of the plurality of luminaires 30, and controlling the at least one of dimming or toning of the plurality of luminaires 30 using the lighting setting value.

This method provides the same advantageous effects as provided by above-described lighting system.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting setting apparatus which is used to set lighting modes in a plurality of luminaires installed in a predetermined space, the lighting setting apparatus comprising: a storage which stores (i) a lighting setting image indicating an entirety of an illumination area of the plurality of luminaires in the predetermined space and (ii) luminaire position information indicating positions of the plurality of luminaires in the predetermined space, in association with the lighting setting image; an input receiver which receives an input by a user, the input regarding use of the lighting setting image; and a lighting setter which obtains target pixel values of target pixels of the lighting setting image for which the input regarding the use has been received, the target pixels being located correspondingly to positions of the plurality of luminaires indicated by the luminaire position information, determines, based on the obtained target pixel values, a lighting setting value for at least one of dimming or toning of the plurality of luminaires, and outputs the determined lighting setting value.

2. The lighting setting apparatus according to claim 1, further comprising:
a display portion which displays the lighting setting image; and
a pixel value determiner which determines second pixel values as pixel values of the lighting setting image to be displayed on the display portion,
wherein the input receiver further receives a user input regarding a setting of at least one of a color or a brightness in the lighting setting image while the lighting setting image is being displayed on the display portion, and
the pixel value determiner determines the second pixel values based on the setting which has been input, and causes the display portion to display the lighting setting image using the second pixel values.

3. The lighting setting apparatus according to claim 2,
wherein the luminaire position information includes a luminaire position image indicating positions of the plurality of luminaires in the predetermined space, and
the pixel value determiner causes the display portion to superimpose and display the lighting setting image and the luminaire position image.

4. The lighting setting apparatus according to claim 2,
wherein the lighting setting image includes a plurality of subareas, and
the input receiver receives an input of a setting of at least one of a color or a brightness for each of the plurality of subareas in the lighting setting image.

5. The lighting setting apparatus according to claim 4,
wherein the plurality of subareas in the lighting setting image include a plurality of first subareas obtained by dividing the lighting setting image.

6. The lighting setting apparatus according to claim 5,
wherein the lighting setting image is a plane image, and the plurality of first subareas are rectangular or hexagonal.

7. The lighting setting apparatus according to claim 5,
wherein the pixel value determiner determines pixel values of pixels in two or more continuous first subareas included in the plurality of first subareas, to be pixel values which gradually change across boundaries between the two or more continuous first subareas.

8. The lighting setting apparatus according to claim 5,
wherein the plurality of subareas further include a second subarea which is circular or a polygonal superimposed and placed by the user on one or more first subareas included in the first subareas at an arbitrary position in the lighting setting image,
in a range in which the second subarea is superimposed on the first subarea, the input receiver further receives a user input regarding a setting of at least one of a color or brightness onto the second subarea, and
the pixel value determiner determines pixel values in the second subarea based on the setting of the at least one of the color or the brightness in the second subarea.

9. The lighting setting apparatus according to claim 1,
wherein the storage stores a plurality of lighting setting images,
the input receiver further receives a user input of a setting regarding a time period in which one of the plurality of lighting setting images is applied, and
the lighting setter determines the lighting setting value for the time period further according to the setting regarding the time which has been input, and outputs the determined lighting setting value.

10. A lighting system, comprising:
the lighting setting apparatus according to claim 1;
a plurality of luminaires; and
the lighting control apparatus which obtains the lighting setting value output from the lighting setting apparatus, and controls the plurality of luminaires using the lighting setting value.

11. A lighting system, comprising: a plurality of luminaires; a storage which stores (i) one or more lighting setting images each indicating an entirety of an illumination area of the plurality of luminaires in a predetermined space in which the plurality of luminaires are installed and (ii) luminaire position information indicating positions of the plurality of luminaires in the predetermined space in association with the one or more lighting setting images; and a controller that: selects a lighting setting image from the one or more lighting setting images by a user input, or creates a lighting setting image by a user input, obtains target pixel values of target pixels of the lighting setting image, the target pixels being located correspondingly to positions of the plurality of luminaires indicated by the luminaire position information, determines, based on the obtained target pixel values, a lighting setting value for at least one of dimming or toning of the plurality of luminaires, and controls the at least one of dimming or toning of the plurality of luminaires using the lighting setting value.

12. A method of controlling a plurality of luminaires, the method comprising: selecting a lighting setting image from one or more lighting setting images by a user input, or creating a lighting setting image by a user input, each of the one or more lighting setting images indicating an entirety of an illumination area of the plurality of luminaires in a predetermined space in which the plurality of luminaires are installed; obtaining target pixel values of target pixels of the lighting setting image, the target pixels being located correspondingly to positions of the plurality of luminaires indicated by luminaire position information indicating positions of the plurality of luminaires in the predetermined space in association with the one or more lighting setting images; determining, based on the obtained target pixel values, a lighting setting value for at least one of dimming or toning of the plurality of luminaires, and controlling the at least one of dimming or toning of the plurality of luminaires using the lighting setting value.

\* \* \* \* \*